April 22, 1952     P. L. KAPITZA     2,593,763
RECTIFICATION APPARATUS
Filed Feb. 20, 1946
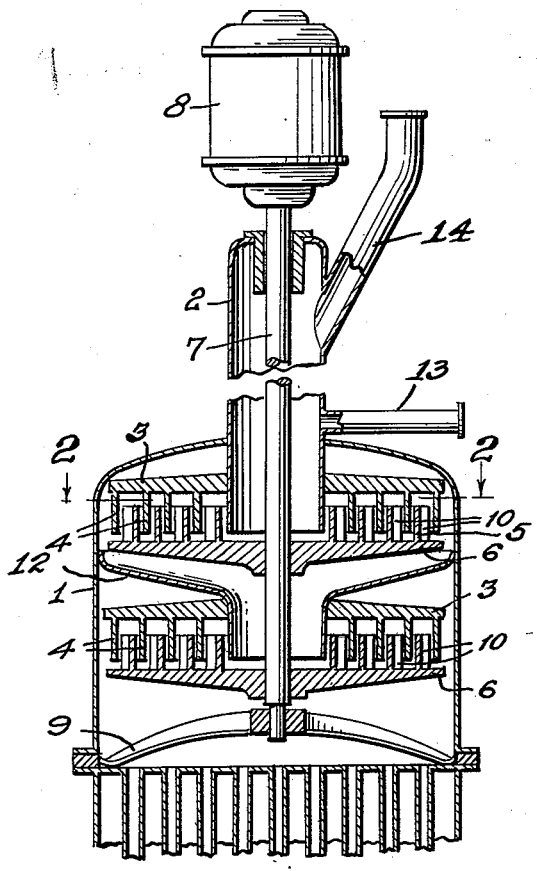
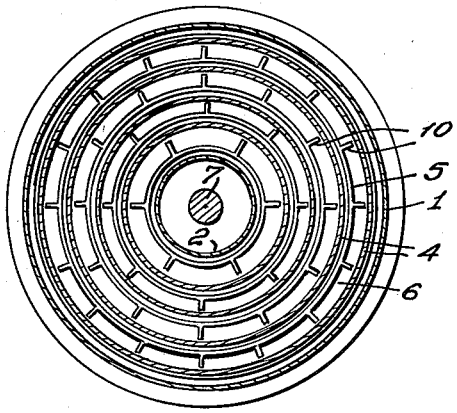
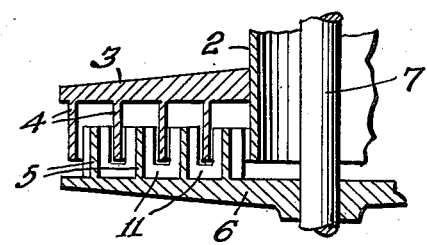
INVENTOR.
P. L. Kapitza
BY
Blascock Downing Reebles
Attorneys.

Patented Apr. 22, 1952

2,593,763

UNITED STATES PATENT OFFICE 2,593,763

RECTIFICATION APPARATUS

Peter Leonidovitch Kapitza, Moscow, Union of Soviet Socialist Republics

Application February 20, 1946, Serial No. 648,907
In the Union of Soviet Socialist Republics
May 15, 1945

1 Claim. (Cl. 261—89)

The present invention relates to method and means for rectification of gaseous mixtures.

The fractional distillation and rectification of gaseous mixtures is usually performed in so called rectifying columns.

There are two types of rectifying columns which are most widely used—the bubbler-hood or bell column and the perforated plate column.

The perforated plates of the latter type of column are made in different forms and serve to distribute and break up the up-flowing gaseous phase into small streams passing through films of the liquid phase as it flows down the column from plate to plate.

Recently, centrifugal rectifiers have been proposed. These comprise a spirally formed rotor on which the liquid phlegm is forced by centrifugal force to the perimeter of the spiral, the gaseous phase moving in the opposite direction, from the perimeter to the centre. It will thus be seen that the contact between the liquid and gaseous phases takes place in a radial direction.

The main defect of these centrifugal rectifiers, in which the different phases come into contact in a radial direction, lies in the lack of intermingling of the phases and the small area of contact between them.

The proposed rectifier according to the present invention avoids this defect by arranging the movement of the liquid and gaseous phases so that the contact is developed in the axial direction.

The perforated plate type of rectifier has the defect that the stream of the gaseous phase rising upwardly through the down flowing liquid phase carries away a considerable portion of phlegm and consequently the number of plates, the diameter and height of the rectifier column have to be increased.

It is proposed to overcome this defect by the use in the rectifier column of rotating vanes which will direct the particles of phlegm carried away by the rising stream of gas from the centre to the periphery under the influence of centrifugal forces, and in this way separate liquid and gaseous phases one from the other.

Centrifugal force can not only be used for separating the liquid and gaseous phases but can be also used to distribute the downflowing stream of phlegm in a thin layer or film over a large area coming into intimate contact with the gases moving in the opposite direction.

The proposed apparatus may be applied for purposes of rectification in different branches of industry and in particular is extremely efficient in refrigerating plants operating at extremely low temperatures for producing liquid oxygen and similar products.

The proposed invention will be described with reference to the appended drawings in which:

Figure 1 is a vertical sectional view through a centrifugal rectifier according to the present invention;

Figure 2 is a cross-sectional view on the section line 2—2 of Figure 1; and

Figure 3 is a fragmentary vertical sectional view of a modified form of the centrifugal rectifier.

It is possible in centrifugal rectifiers to distribute the liquid phase in a thin film over considerable areas without the use of perforated plates as in the usual rectifying column.

An apparatus for effecting this result is shown in Figures 1 and 2.

In the embodiment shown in Figures 1 and 2 is a pipe 2 fixed in a jacket 1. A conduit 13 communicates radially with the pipe 2 for admission of the phlegm and a second conduit 14 communicates with the pipe 2 adjacent the top of the latter for leading off the separated gaseous phase. At its lower end the pipe 2 has attached thereto a stationary horizontal disc 3 having concentric cylindrical partitions 4. A rotary horizontal disc 6 is fixed on an axle or shaft 7, which is rotated by a motor 8, and has complementary concentric cylindrical partitions 5 interposed between those of stationary disc 3. The lower end of the shaft 7 is supported in a bearing arranged in a transverse bridge member 9. The cylindrical partitions 5 of disc 6 are provided with radial projections, or vanes 10, which extend outwardly towards the cylindrical partitions 4 on the stationary disc 3.

The liquid being rectified is passed through pipe 2 on to the central part of rotary disc 6 and is distributed in a thin layer over the inner surface of the cylindrical partition 5 under the influence of centrifugal force due to the rotation of the disc 6 by the shaft 7 of the motor 8. The vanes 10 throw the liquid phase onto the surface of the cylindrical partitions 4 of the stationary disc 3, down which it flows onto the rotary disc 6 between the first and second cylindrical partitions 5 thereon, and is again distributed in a thin layer which is then thrown onto the next outer cylindrical partition 4 of the stationary disc 3, and so on until it reaches the edge of this disc.

The phlegm constantly moves outwardly under the influence of centrifugal force in the form of a thin film while the gaseous phase moves inwardly to the centre in the labyrinthical space between the projection on the discs 3 and 6.

In doing so, the gaseous phase removes one component of the liquid phase, absorbing it and carrying it off through the pipe 2 and conduit 14. The phlegm in which the remaining components are highly concentrated is thrown off the edge of rotary disc 6 by centrifugal force.

According to the present invention there are two sets of the stationary and rotary discs, and of course the partitions thereon and the vanes on the partitions of the rotary discs, and these are arranged in series, to increase the area of surface contact between the phases. As the phlegm is thrown off the edge of the upper rotary disc 6, it passes into a flared conduit or funnel member 12 which has its lower end positioned just above and at the center of the second rotary disc 6. The separation action in the lower series of discs is the same as that previously described in connection with the upper series of discs. The gaseous phase is introduced in the lower section, moves upwardly to the upper section, and ultimately leaves the column through the pipe 2 and conduit 14. At the same time the phlegm is introduced through the conduit 13 at the top of the column and flows downwardly with the desired liquid component becoming increasingly concentrated.

In the embodiment illustrated in Figure 3 the vanes 11 between successive concentric partitions 5 of the disc 6 are arranged on both sides of the partitions and have centrally disposed cut away portions for receiving the cylindrical partitions 4 of the stationary disc 3. This arrangement effects a marked improvement in the action of the vanes 11.

Having now fully described my invention, what I claim as new and useful and desire to secure by Letters Patent of the United States is:

A rectifying apparatus comprising a central inlet conduit for liquid to be rectified and having outlet means connected thereto for the released gas, a casing into which said conduit extends, a fixed horizontal disc positioned within said casing and surrounding and secured to said central inlet conduit, a rotatable disc within said casing mounted in parallel relationship with the fixed disc and adjacent the end of the central inlet conduit and forming a first rectifying stage, a flared second conduit concentrically positioned in said casing with respect to the first inlet conduit and having its top adjacent the periphery of the rotatable disc for receiving liquid therefrom, a second fixed horizontal disc positioned within said casing and surrounding and secured to the second conduit, a second rotatable disc within said casing mounted in parallel relationship with the second fixed disc and forming with the latter a second rectifying stage, the flared second conduit having its bottom adjacent the second rotatable disc at the center of the latter for discharging the liquid in a thin film thereover, concentrically arranged annular projections on the fixed discs extending toward the rotatable discs, concentrically arranged annular projections on the rotatable discs extending toward the fixed discs and positioned intermediate the projections on the latter, and vanes formed on the annular projections on the rotatable discs and extending radially toward the annular projections on the fixed discs, respectively, whereby the liquid is thrown by the projections on the rotary discs successively against the projections on the fixed discs.

PETER LEONIDOVITCH KAPITZA.

REFERENCES CITED

The following references are of record in the file of this patent:

UNITED STATES PATENTS

| Number | Name | Date |
| --- | --- | --- |
| 820,772 | Elsenhans | May 15, 1906 |
| 1,080,445 | Hey | Dec. 2, 1913 |
| 1,308,338 | Davidson | July 1, 1919 |
| 1,707,548 | Brassert | Apr. 2, 1929 |
| 2,387,231 | Bottoms et al. | Oct. 23, 1945 |

FOREIGN PATENTS

| Number | Country | Date |
| --- | --- | --- |
| 10,299 | Great Britain | June 17, 1891 |
| 466,456 | France | May 14, 1914 |
| 43,141 | Sweden | Feb. 18, 1916 |